March 30, 1948.　　C. V. LUNDEEN　　2,438,813
ENGRAVING APPARATUS
Filed Sept. 15, 1945　　2 Sheets-Sheet 1

INVENTOR
C. V. LUNDEEN
BY
ATTORNEY

March 30, 1948.  C. V. LUNDEEN  2,438,813
ENGRAVING APPARATUS
Filed Sept. 15, 1945   2 Sheets-Sheet 2
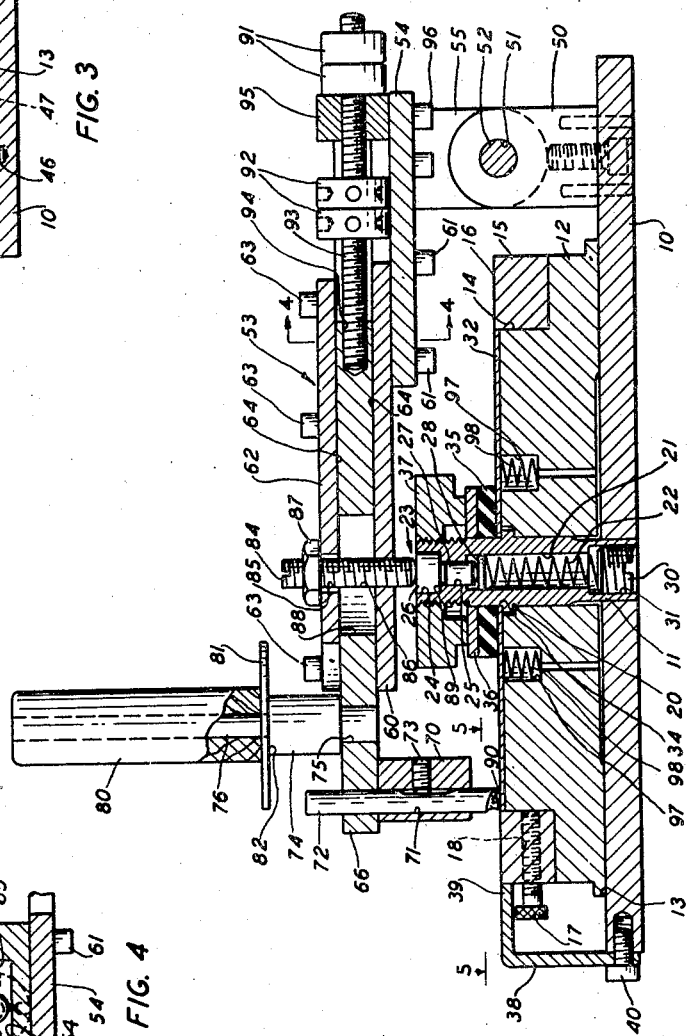
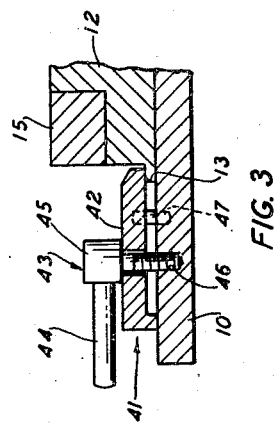
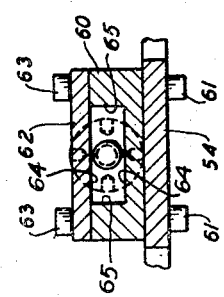
INVENTOR
C. V. LUNDEEN
BY
ATTORNEY Patented Mar. 30, 1948

2,438,813

UNITED STATES PATENT OFFICE 2,438,813

ENGRAVING APPARATUS

Carl V. Lundeen, Towson, Md., assignor to Western Electric Company, Incorporated, New York, N. Y., a corporation of New York Application September 15, 1945, Serial No. 616,624

12 Claims. (Cl. 33—19)

This invention relates to engraving apparatus, and more particularly to apparatus for engraving divisions on dials.

Dial engraving apparatus in use at the present time usually are designed for the purpose of transferring the calibrations of a master dial to a dial blank exactly as they appear on the master dial, whereby an exact copy of the master dial is engraved on the dial blank. Transmitters normally require dials calibrated with an irregular system of main divisions and subdivisions to suit the particular characteristics of the transmitter with which they are to be used. Also, the irregular system of subdivisions will vary between different types of transmitters which necessitates having a master dial for each irregular system of subdivisions required.

The present invention provides a dial engraving apparatus wherein it is not necessary to have a complete master dial for each irregular system of subdivision but merely a single rotatably mounted ring having a portion of its face so calibrated that the space between the divisions thereon progressively increases throughout its calibrated portion.

The object of the present invention is to provide new and improved engraving apparatus.

A further object of the invention is to provide dial engraving apparatus for engraving the same number of subdivisions within the spaces between the main divisions on a dial blank, which main divisions are spaced varying degrees apart around the periphery of the dial blank.

In accordance with one embodiment of the invention there is provided a dial engraving apparatus comprising a circular dial support rotatably mounted on a suitable base, and an engraving arm pivotally mounted on said base so that it may extend diametrically across the top of said dial support. The dial support is provided with means at its periphery for rotatably mounting a calibrated ring and means are provided for clamping a dial blank to be engraved adjacent to the inner periphery of the calibrated ring.

Other objects and advantages of the invention will more fully appear from the following detailed description, taken in conjunction with the accompanying drawings, in which:

Fig. 2 is a vertical sectional view taken along line 2—2 of Fig. 1;

Fig. 3 is a fragmentary, vertical sectional view taken along line 3—3 of Fig. 1;

Fig. 4 is a fragmentary, vertical sectional view taken along line 4—4 of Fig. 2.

Figure 1:
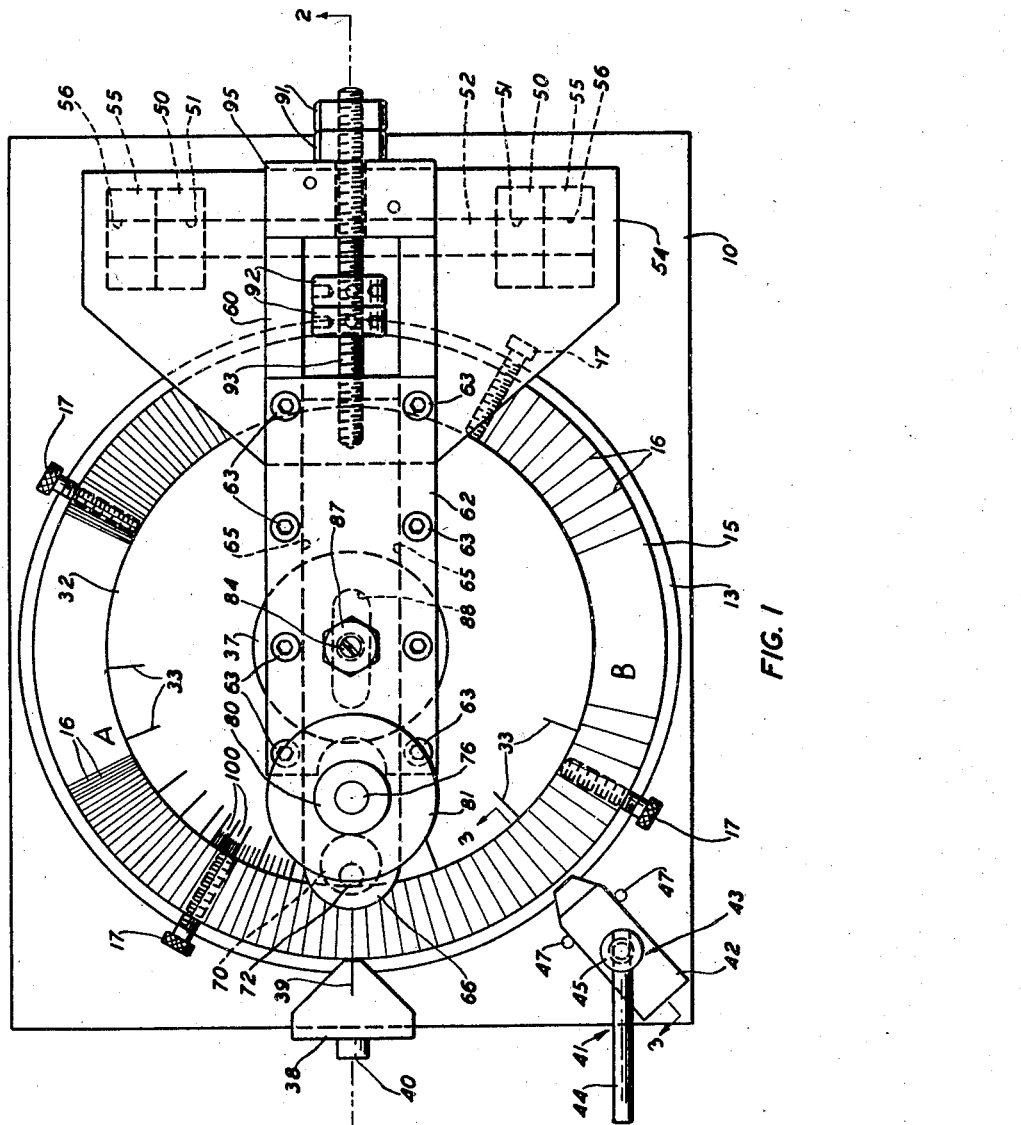
Fig. 1 is a plan view of an engraving apparatus embodying the features of the invention.
Figure 5:
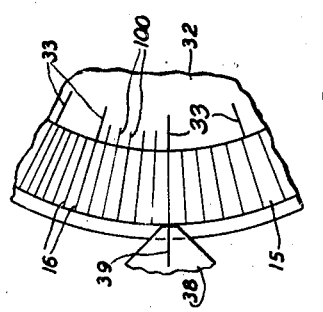
Fig. 5 is a fragmentary, horizontal sectional view taken along line 5—5 of Fig. 2.

Referring to the drawings, and particularly to Fig. 2, an engraving apparatus is illustrated comprising, in the present embodiment of the invention, a rectangular base 10 to which a post 11 is rigidly secured in the center thereof. A circular dial support 12 is rotatably mounted on the post 11, and is provided with a flange 13 and a peripheral groove 14. A ring 15 is rotatably mounted in the peripheral groove 14 and has a predetermined number of calibrations 16—16 engraved radially across a portion A—B of its face from its inner periphery to its outer periphery, as shown in Figs. 1 and 5. The angle between each of the calibrations 16—16 is arranged to uniformly increase by small increments throughout the calibrated portion A—B of the ring 15. The ring 15 may be locked in any selected position on the dial support 12 by means of a plurality of thumbscrews 17—17 threadedly mounted in tapped bores 18—18 extending through the ring 15. A shoulder 20 provided on the post 11 prevents axial movement of the dial support 12 between the shoulder 20 and the base 10.

A bore 21 is provided in the central portion of post 11 to receive a spring 22, which serves to urge upwardly a plunger 23 slidably mounted in a counterbore 24 and a bore 25 provided in the upper end of the post 11. The plunger 23 is provided with a head 26 which slidably engages the counterbore 24 and a shank portion 27 which protrudes through the bore 25 to engage a disc 28 positioned above the spring 22. The spring 22 is retained in the bore 21 by means of a set screw 30 threaded into a tapped counterbore 31 provided in the lower end of the post 11.

A dial blank to be engraved, such as a circular, disc-like dial blank 32, having a predetermined number of main division lines 33—33 previously engraved on one face thereof to suit the particular apparatus on which the dial is to be finally assembled. The dial blank is placed on the dial support 12 with its periphery in engagement with the inner periphery of the ring 15, the calibrated face of which projects above the top surface of the dial support 12 a distance approximately equal to the thickness of the dial blank 32. The dial blank 32 has a central aperture 34 which surrounds the post 11 and is rigidly secured to the dial support 12 by means of a rubber washer 35, a plate washer 36 and a knurled hand-nut 37. An engraving indicator 38 having an index mark 39 thereon is rigidly secured in horizontal alignment with the calibrated face of the ring 15 by means of a bolt 40 threaded into the base 10.

A clamp 41 (Fig. 3) is provided for locking the dial support 12 in a selected position and preventing rotation thereof with respect to the base 10. The clamp 41 comprises a clamping bar 42, and a clamping lever 43 which includes a handle 44 rigidly secured in the head of a bolt 45 threaded into a tapped bore 46 in the base 10. A pair of pins 47—47 serve to align one end of the clamping bar 42 on the flange 13 of the dial support 12, and prevent lateral movement of the clamping bar when the clamping lever 43 is turned.

A pair of bearings 50—50 are rigidly secured to the base 10 (Fig. 1) and have bores 51—51 provided therein to receive a shaft 52. Pivotally mounted on the base 10 is an engraving assembly 53, comprising a plate 54 to which are rigidly secured a pair of bearings 55—55 spaced so as to align with the bearings 50—50 secured to the base 10 and provided with bores 56—56 complementary to the bores 51—51 so as to receive the shaft 52. A channel 60 (Fig. 4) is rigidly secured to the plate 54 by bolts 61—61 and a cover plate 62 is secured to the legs of the channel by bolts 63—63. The channel 60 and the cover plate 62 extend beyond the plate 54 diametrically across the dial support 12 a substantial distance beyond the center of the dial support 12. The channel 60 and cover plate 62 form a rectangular cavity therebetween having walls 64—64 and 65—65 into which a bar 66 is slidably mounted. The rectangular cavity formed by the walls 64—64 and 65—65 provides a neat sliding fit for the bar 66 wherein only a longitudinal sliding movement of the bar 66 is possible.

The bar 66 has secured on the left extremity thereof, as seen in Fig. 2, an engraving tool support 70 having a bore 71 provided therethrough to receive an engraving tool 72, which is rigidly secured in the bore 71 by means of a set screw 73. The engraving tool 72 is secured on the horizontal centerline of the engraving assembly 53, which centerline is directly in line with the index mark 39 of the engraving indicator 38. A handle post 74 is rigidly secured in a bore 75 of the bar 66, and has its upper portion 76 substantially reduced in diameter to receive a hand grip 80 rotatably mounted thereon. A circular hand rest 81 is mounted on the handle post 74 between a shoulder 82 of the post 74 and the handle grip 80 to enable an operator to effectively exert a downward force upon the engraving assembly 53 during an engraving operation upon the dial blank 32.

A threaded stud 84 is secured to the engraving assembly 53 by means of a clearance bore 85 in the cover plate 62 and a tapped bore 86 in the bottom of the channel 60 and is locked in its desired position by a nut 87. The threaded stud 84 is positioned on the engraving assembly 53 directly over the spring-pressed plunger 23, as shown in Fig. 2. The spring 22 forces the plunger 23 into contact with the bottom of the threaded stud 84 and holds the engraving assembly 53 in such position that the engraving knife 72 is prevented from engaging the dial blank 32. The slidable bar 66 is provided with a slot 88 through which the threaded stud 84 passes, and thereby does not interfere with the sliding movement of the bar 66.

When an engravure is to be made upon the dial blank 32, the engraving assembly 53 is pushed downwardly against the spring-pressed plunger 23 by means of the handle grip 80 and the hand rest 81, until the head 26 of the plunger 23 abuts a shoulder 89 of the counterbore 24 in the post 11, causing a knife edge 90 of the engraving tool 72 to pierce the surface of the dial blank 32. The engraving tool 72 is now drawn across the dial blank 32 a predetermined distance by urging the bar 66 to the right by means of the handle grip 80. The depth of the engravure made on the dial plate 24 is controlled by adjusting the protrusion of the threaded stud 84 below the channel 60.

The travel of the bar 66 and the engraving tool 72 is controlled by the location of a pair of knurled nuts 91—91 and a pair of spanner nuts 92—92 positioned on a threaded rod 93 which is secured in a tapped bore 94 provided in the right hand end of the bar 66. A stop 95 is rigidly secured by bolts 96—96 on the right hand end of plate 54 intermediate the knurled nuts 91—91 and the spanner nuts 92—92. The knurled nuts 91—91 serve to locate the engraving knife 72 at the periphery of the dial blank 32 and the spanner nuts 92—92 serve to limit the length of the engravure to be made on the dial blank 32.

A plurality of bores 97—97 are provided in the dial support 12 and are equally spaced about the axis of the post 11. Compression springs 98—98 are positioned in the bores 97—97 and serve to urge the dial blank 32 upwardly above the face of the ring 15 when the hand-nut 37 is removed from the post 11 upon the completion of engraving operations. This feature facilitates the removal of the engraved dial blank 32 from the dial support 12.

The above-described embodiment of the invention operates as follows:

The engraving assembly 53 is rotated on the shaft 52 to a substantially vertical position, whereby a circular dial blank 32, to be engraved, may be placed on the dial support 12 and secured thereon by means of the rubber washer 35, the plate washer 36 and the hand-nut 37. The dial blank 32 to be engraved has been calibrated on the apparatus with which it is to be used whereby a predetermined number of unequally spaced main divisions 33—33 have been marked thereon, as shown in Fig. 1. The periphery of the dial blank 32 substantially engages the inner periphery of the calibrated ring 15, so that a selected group of calibrations 16—16 on the face of the ring 15 may be accurately aligned between the main divisions 33—33 on the face of the dial blank 32.

In a specific instance it may be required that the dial blank 32 have each of the spaces between its main divisions 33—33 engraved with five subdividing lines 100—100, as shown in Fig. 5, thereby dividing the spaces into six parts. Having selected the space between two particular main divisions 33—33 to be engraved, the calibrated ring 15 is rotated about the dial support 12 and the dial blank 32 until a group of seven consecutive calibration marks 16—16 are aligned opposite the selected space to be engraved so that the first and last calibration marks of the group are directly aligned with the two division lines 33—33 embracing the selected space to be engraved on the dial blank, and the five intermediate calibrations 16—16 are aligned within the selected space.

Positioning the calibrated ring in this manner is a comparatively simple and accurately accomplished operation due to the fact that there are a plurality of calibrations 16—16 marked on the face of the ring in which the angle between the first two calibrations is very small and the angle between each of the succeeding calibrations 16—16 is increased by very small increments throughout the calibrated portion A—B. This arrangement of the calibrations 16—16 makes the calibrated portion of the ring 15 operate substantially as a vernier, wherein the space on the dial blank between any two selected main division lines 33—33 may be accurately subdivided into any desired number of subdivisions in the manner described above.

After the correct group of calibrations on the ring 15 has been aligned with the selected main divisions on the dial blank 32, the ring 15 is clamped to the support 12 in this position by means of the thumbscrews 17—17. The dial support 12 then is rotated about the post 11 to locate the first calibration of the selected group of calibrations of the ring 15 to be engraved on the dial blank 32 directly in line with the index mark 39. The dial support 12 is clamped in this position to the base 10 by means of the clamping device 41.

The engraving assembly 53 now is brought down to its horizontal engraving position, as shown in Fig. 2, whereupon the handle grip 80 is urged to the left until the nuts 91—91 abut the stop 95, whereby the engraving tool 72 is located at the periphery of the dial blank 32. The engraving assembly 53 then is pressed downwardly against the spring-pressed plunger 23 to cause the knife edge 90 to pierce the surface of the dial blank at its periphery and then is drawn to the right across the dial blank 32 to cut an engravure or subdivision line 100 in the dial blank 32. The engraving tool 72 is drawn across the dial blank 32 until the spanner nuts 92—92 abut the stop 95, whereupon the engraving assembly may be released. Upon releasing the engraving assembly 53, the spring-pressed plunger 23 raises the engraving assembly 53 and its engraving tool 72 out of engagement with the surface of the dial blank 32, whereupon the dial support 12 may be unclamped, rotated to locate the next calibration of the ring 15 directly opposite the index mark 39 and clamped in this position by clamping device 41. The handle grip 80 is now urged to the left whereupon the engraving tool 72 is returned to the periphery of the dial blank 32, pressed down and drawn to the right across the dial blank 32, whereby another subdivision line 100 is engraved on the dial blank 32. This procedure is repeated until the entire space between the selected main divisions 33—33 on the dial blank 32 has been completely subdivided to correspond to the selected group of calibrations 16—16 of the ring 15.

Since it is required that the space between each succeeding pair of main divisions 33—33 on the dial blank 32 be divided into six parts regardless of the space between the main divisions, the ring 15 must be unclamped and again rotated about the dial blank 32 until another group of seven consecutive calibrations 16—16 are located with the next selected pair of main divisions 33—33 of the dial blank 32. The ring 15 is clamped in this position and the dial support 12 is now rotated to locate the first calibration to be engraved on the dial blank 32 directly in line with the index mark 39. The dial support is clamped in this position, whereupon an engravure is made on the dial blank 32 by movement of engraving tool 72, as described above. This procedure is repeated until each of the spaces between the unequally spaced main divisions 33—33 have the same number of subdivisions 100—100 engraved therein.

It is obvious from the above disclosure that the ring 15 may be readily removed from the dial support 12 and replaced by another ring having divisions engraved thereon which will permit the engraving of a dial blank to suit a different predetermined pattern.

What is claimed is:

1. A dial engraving apparatus comprising a base, a circular support rotatably mounted on the base, a calibrated ring rotatably mounted on the support, means for clamping a circular dial to be engraved on the support so that its periphery slidably engages the inner periphery of the calibrated ring, means for selectively clamping the calibrated ring to the support to position a selected portion thereof with respect to a selected portion of the dial secured on the support, engraving means pivotally mounted on the base, and means for selectively clamping the support to the base to prevent rotation thereof with respect to the engraving means.

2. A dial engraving apparatus comprising a base, a circular support rotatably mounted on the base, a calibrated ring rotatably mounted on the support, means for clamping a circular dial blank to be engraved on the support so that its periphery slidably engages the inner periphery of the calibrated ring, means for positioning a selected portion of the calibrated ring opposite a selected portion of the dial blank to be engraved, engraving means pivotally mounted on the base so that it may extend diametrically across the support to the periphery of the dial blank to be engraved, means provided on the engraving means for limiting the depth of engravures made by the engraving means, and means for selectively clamping the support to the base to prevent rotation thereof with respect to the engraving means.

3. A dial engraving machine comprising a rotatable support, a calibrated ring rotatably positioned on the support, means for clamping a dial blank to be engraved on the support, means for selectively locking the calibrated ring to the rotatable support to prevent rotation thereof with respect to the dial blank secured on the support, pivotally mounted engraving means which may be extended diametrically across the dial support, an engraving tool slidably mounted on the engraving means, means provided on the engraving means for locating the engraving tool adjacent to the inner periphery of the calibrated ring, means provided on the engraving means for manually exerting a downward pressure on the engraving tool and for moving the engraving tool from the inner periphery of the calibrated ring radially toward the center of the support, means for limiting the radial travel of the engraving tool, means for selectively clamping the rotatable support during an engraving operation, and spring-pressed means for normally preventing the engagement of the engraving tool with the dial blank to be engraved.

4. A dial engraving machine comprising a rotatable support, a calibrated ring rotatably mounted on the support, means for clamping a dial blank to be engraved on the support so that its periphery slidably engages the inner periphery of the calibrated ring, means for selectively clamping the calibrated ring on the support to position a pre-selected number of divisions on the ring opposite a selected space on the dial blank to be engraved, engraving means including a slidably mounted engraving tool, means for manually moving the engraving tool across the dial blank radially toward the center of the support, and means for limiting the travel of the engraving tool toward the center of the dial support.

5. A dial engraving apparatus comprising a base, a circular support rotatably mounted on the base, means for clamping a dial blank to be engraved on the support, a calibrated ring rotatably mounted on the support so that it encompasses the dial blank secured on the support and has its face in the same plane as the face of the dial blank clamped on the support, means for selectively clamping the calibrated ring to the support, engraving means pivotally mounted on said base so that it may extend diametrically across the support, means provided on the engraving means for accurately locating the engraving means at the inner periphery of the calibrated ring, means provided on the engraving means for limiting the depth of cut to be made by the engraving means, and means for selectively clamping the support to the base to prevent rotation thereof during an engraving operation.

6. A dial engraving apparatus comprising a base, a circular dial support rotatably mounted on the base, means for rotatably mounting a calibrated ring on the dial support, means for clamping a circular dial blank to be engraved on the dial support so that its periphery engages the inner periphery of the calibrated ring, means for selectively clamping the calibrated ring to the dial support, an engraving arm pivotally mounted on the base so that it may be extended diametrically across the dial support to the inner periphery of the calibrated ring, engraving means slidably mounted on the engraving arm, adjustable means on the engraving means for accurately locating the engraving means at the periphery of the calibrated ring, means for limiting the travel of the engraving means, and means for clamping the dial support to the base during an engraving operation.

7. A dial engraving apparatus comprising a base, a circular dial support rotatably mounted on the base, means for rotatably mounting a calibrated ring on the dial support, means for clamping a disc-like dial blank on the dial support so that its periphery slidably engages the inner periphery of the calibrated ring, means for selectively positioning the calibrated ring about the dial blank secured on the dial support, slidable engraving means pivotally mounted on the base so that it may be positioned diametrically across the dial support, adjustable means provided on the engraving means for locating the engraving means at the inner periphery of the calibrated ring, adjustable means on the engraving means for controlling the depth of cut made by the engraving means, adjustable means provided on the engraving means for limiting the longitudinal movement of the engraving means, an engraving indicator secured to the base adjacent to the outer periphery of the calibrated ring and having an index mark thereon directly in line with the engraving means, and means for selectively clamping the dial support to the base with a selected division on the calibrated ring and the index mark directly aligned.

8. A dial engraving apparatus comprising a rotatable dial support having a peripheral groove cut therein, means for clamping a dial blank to be engraved on the dial support, a calibrated ring positioned in the peripheral groove in the dial support and rotatable about the dial blank to be engraved, means for selectively positioning the calibrated ring about the dial blank secured on the dial support, engraving means pivotally mounted so that it may be extended diametrically across the dial support, means for locating the engraving means at a predetermined point on the dial blank to be engraved, means for manually actuating the engraving means, adjustable means for limiting the depth of cut to be made by the engraving means, an engraving indicator adjacent to the outer periphery of the calibrated ring and having an index mark thereon directly in line with the engraving means, and means for selectively positioning the calibrated ring with respect to the index mark.

9. A dial engraving apparatus comprising a rotatable dial support having an annular groove at its periphery, a calibrated ring rotatably mounted in the annular groove, means for clamping a circular dial blank on the dial support so that its periphery slidably engages the inner periphery of the calibrated ring, means for selectively positioning the calibrated ring on the dial support, engraving means pivotally mounted so that it may be extended diametrically across the rotatable dial support, means for manually actuating the engraving means, means for limiting the cutting stroke of the engraving means, adjustable means provided on the engraving means for limiting the depth of a cut to be made on the dial blank secured to the support, spring-pressed means for normally preventing engagement of the engraving means with the dial blank to be engraved, an engraving indicator positioned adjacent to the outer periphery of the calibrated ring and having an index mark thereon directly in line with the engraving means, and means for selectively positioning the rotatable dial support to maintain a selected division of the calibrated ring in alignment with the index mark of the indicator.

10. A dial engraving apparatus comprising a base, a circular support rotatably mounted on the base for supporting a dial to be engraved, a ring rotatably mounted on the support and having a plurality of predetermined calibrations on a portion of its face, an engraving indicator secured on the base and having an index mark thereon in horizontal alignment with the calibrated face of the ring, engraving means pivotally mounted on the base so that it may extend diametrically across the dial support to the inner periphery of the calibrated ring and directly in line with the index mark of the engraving indicator, and means for selectively clamping the dial support to the base to prevent rotation thereof during an engraving operation.

11. A dial engraving machine comprising a rotatable support, means for clamping thereon a dial blank having a predetermined number of unequally spaced main divisions marked on its face, a ring rotatably mounted on the support and having a portion of its face calibrated so that the spaces between the individual calibrations progressively increase throughout the calibrated portion, means for selectively locking the ring to the support to prevent relative rotation thereof after a selected number of its calibration marks have been positioned between a selected pair of main divisions on the dial blank to be engraved, engraving means which may be extended diametrically across the support and including a slidably mounted engraving tool, means provided on the engraving means for locating the engraving tool adjacent to the inner periphery of the ring, means for manually moving the engraving tool, an engraving indicator positioned adjacent to the outer periphery of the ring and having an index mark thereon directly in line with the engraving tool, and means for clamping the rotatable support with respect to the engraving means so that the selected calibration on the ring to be engraved on the selected space of the dial blank is aligned with the index mark of the engraving indicator.

12. A dial engraving apparatus comprising a rotatable support having an annular groove at its periphery, a ring rotatably mounted in the annular groove, said ring having a plurality of calibration lines provided on a portion of its face, means for clamping a dial blank to be engraved on the support so that its periphery slidably engages the inner periphery of the calibrated ring, means for positioning the calibrated ring on the dial support so that a selected group of its calibrations is positioned opposite a portion of the dial to be engraved, engraving means capable of being extended diametrically across the rotatable support and including a slidably mounted engraving knife, means for manually moving the engraving knife, means for limiting the travel of the engraving knife, means provided on the engraving means for locating the engraving knife at the periphery of the dial blank secured on the support, adjustable means for limiting the depth of cut to be made by the engraving knife, spring-pressed means for normally preventing engagement of the engraving knife with the dial blank to be engraved, an engraving indicator positioned adjacent to the outer periphery of the calibrated ring and having an index mark thereon directly in line with the engraving knife, and means for selectively positioning the rotatable support to maintain a selected division of the calibrated ring aligned with the index mark.

CARL V. LUNDEEN.

REFERENCES CITED

The following references are of record in the file of this patent:

UNITED STATES PATENTS

| Number | Name | Date |
|---|---|---|
| 344,676 | Ourdan | June 29, 1886 |
| 1,894,976 | Brower | Jan. 24, 1933 |